US012807536B2

(12) United States Patent
Kurizoe et al.

(10) Patent No.: US 12,807,536 B2
(45) Date of Patent: Nov. 24, 2026

(54) COMPOSITE MEMBER

(71) Applicant: Panasonic Intellectual Property Management Co., Ltd., Osaka (JP)

(72) Inventors: Naoki Kurizoe, Osaka (JP); Natsuki Sato, Osaka (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 1160 days.

(21) Appl. No.: 17/762,256

(22) PCT Filed: Aug. 27, 2020

(86) PCT No.: PCT/JP2020/032387
§ 371 (c)(1),
(2) Date: Mar. 21, 2022

(87) PCT Pub. No.: WO2021/065261
PCT Pub. Date: Apr. 8, 2021

(65) Prior Publication Data

US 2022/0340492 A1 Oct. 27, 2022

(30) Foreign Application Priority Data

Sep. 30, 2019 (JP) ................................ 2019-178441

(51) Int. Cl.
*C04B 35/117* (2006.01)
*C04B 14/30* (2006.01)

(52) U.S. Cl.
CPC .......... *C04B 35/117* (2013.01); *C04B 14/303* (2013.01); *C04B 2235/3217* (2013.01); *C04B 2235/48* (2013.01); *C04B 2235/5436* (2013.01)

(58) Field of Classification Search
None
See application file for complete search history.

(56) References Cited

U.S. PATENT DOCUMENTS 4,588,443 A * 5/1986 Bache ................. B28B 23/0081 106/676
5,234,754 A 8/1993 Bache
2002/0114941 A1 8/2002 Franke et al.
(Continued)

FOREIGN PATENT DOCUMENTS

CN 103703080 A 4/2014
JP S58-11378 B2 3/1983
(Continued)

OTHER PUBLICATIONS

Machine Translation of WO-2008120505-A1 ("Kondo") (Year: 2008).*
Greer et al., "Fluorinated ethylene-propylene: A complementary alternative to PDMS for nanoimprint stamps," Nanotechnology 27 (2016), 155301. (Year: 2016).*
Fogaing et al., "Young's modulus of zirconia at high temperature," J. Mater. Sci. 41 (2006), 7663-7666. (Year: 2006).*
(Continued)

*Primary Examiner* — Jennifer A Smith
*Assistant Examiner* — Paul Alan Forsyth
(74) *Attorney, Agent, or Firm* — Renner, Otto, Boisselle & Sklar LLP

(57) ABSTRACT

A composite member includes an inorganic matrix part made from an inorganic substance and a dispersed component present in a dispersed state within the inorganic matrix part and having elasticity, wherein a material making up the dispersed component has a modulus of elasticity in tension of 100 Pa or more and 3.5 GPa or less. The composite member has a porosity of 20% or less in a section of the inorganic matrix part.

12 Claims, 9 Drawing Sheets

(56) References Cited

U.S. PATENT DOCUMENTS

| | | | | |
|---|---|---|---|---|
| 2014/0142219 | A1 | 5/2014 | Akita et al. | |
| 2019/0202740 | A1* | 7/2019 | Laurin | C04B 35/488 |

FOREIGN PATENT DOCUMENTS

| | | | | |
|---|---|---|---|---|
| JP | 60-059182 | B | 12/1984 | |
| JP | H03-115148 | A | 5/1991 | |
| JP | H04-130041 | A | 5/1992 | |
| JP | H06-49604 | B2 | 6/1994 | |
| JP | 10-101450 | A | 4/1998 | |
| JP | 11-079859 | A | 3/1999 | |
| JP | 2001-302312 | A | 10/2001 | |
| JP | 2002-087861 | A | 3/2002 | |
| JP | 2005-281035 | A | 10/2005 | |
| JP | 2007-201363 | A | 8/2007 | |
| WO | WO-0155051 | A1 * | 8/2001 | C04B 16/04 |
| WO | 2008035197 | A2 | 3/2008 | |
| WO | WO-2008120505 | A1 * | 10/2008 | C03C 17/007 |
| WO | WO-2014184393 | A1 * | 11/2014 | C04B 30/02 |
| WO | 2018/039620 | A1 | 3/2018 | |

OTHER PUBLICATIONS

Majeed et al., "Comparison of the effect of carbon, halloysite and titania nanotubes on the mechanical and thermal properties of LDPE based nanocomposite films," Chinese J. of Chem. Eng. 26 (2017), pp. 428-435. (Year: 2017).*

Soomro et al., "Nanoscale elastic modulus of single horizontal ZnO nanorod using nanoindentation experiment," Nanoscale Research Letters (2012) 7:146. (Year: 2012).*

Jiang et al., "Preparation of high density ZnO ceramics by the Cold Sintering Process," Ceramics International 45 (2019), pp. 17382-17386. (Year: 2019).*

International Search Report for corresponding Application No. PCT/JP2020/032387, mailed Oct. 20, 2020.

Written Opinion for corresponding Application No. PCT/JP2020/032387, mailed Oct. 20, 2020.

Search Report for corresponding CN Application No. 202080063012.2 issued Oct. 8, 2022.

Extended European Search Report for corresponding EP Application No. 20870506.1 issued Oct. 20, 2022.

* cited by examiner (a)

SECONDARY ELECTRON IMAGE (POSITION 1)

(b)

BINARIZED DATA (POSITION 1)

(a)

SECONDARY ELECTRON IMAGE (POSITION 2)

(b)

BINARIZED DATA (POSITION 2)

(a)

SECONDARY ELECTRON IMAGE
(POSITION 3)

(b)

BINARIZED DATA (POSITION 3)

(a)

SECONDARY ELECTRON IMAGE (POSITION 1)

(b)

BINARIZED DATA (POSITION 1)

(a)

SECONDARY ELECTRON IMAGE (POSITION 2)

(b)

BINARIZED DATA (POSITION 2)

(a)

SECONDARY ELECTRON IMAGE (POSITION 3)

(b)

BINARIZED DATA (POSITION 3)

COMPOSITE MEMBER

TECHNICAL FIELD

The present invention relates to a composite member.

BACKGROUND ART

Ceramics are known to have high strength and heat resistance, but they are also known to be difficult to strain. Thus, when a load (impact) is applied to ceramics, sudden fracture may occur due to their low ability to relieve the load. To improve such properties, researches to impart shock absorbency to ceramics have been actively conducted.

Patent Literature 1 discloses a composite structure that is lightweight, difficult to crack, and excellent in shock absorbency. Specifically, Patent Literature 1 discloses a composite structure obtained by stacking a fiber bundle layer formed by bundling composite fiber bodies each made from a long core material and a coating layer, which covers the periphery of the core material and is made from a composition different from that of the core material, and a single ceramic layer. It is described that this structure allows the direction of travel of cracks generated by impact to be deflected by contact with the composite fiber body, resulting in a high impact absorbing effect.

CITATION LIST

Patent Literature

Patent Literature 1: Japanese Unexamined Patent Application Publication No. 2005-281035

SUMMARY OF INVENTION

However, in the composite structure of Patent Literature 1, the fiber bundle layer and the single ceramic layer have different constituent materials from each other, thereby having different thermal expansion coefficients from each other. Thus, the fiber bundle layer may be peeled off from the single ceramic layer after a long-term use. Further, since the composite structure of Patent Literature 1 is a stacked structure, it has an absorption effect on impact from the fiber bundle layer side but has an insufficient absorption effect on impact from the single ceramic layer side. Thus, the shape of the composite structure must be such that the shock is absorbed on the fiber bundle layer side, and thus the shape for the shock absorbency is limited.

The present invention has been made in consideration of such issues as described above, which is inherent in related art. An object of the present invention is to provide a composite member that is stable for a long time and is capable of absorbing shock as a whole.

To solve the above issue, a composite member according to an aspect of the present invention includes: an inorganic matrix part made from an inorganic substance; and a dispersed component present in a dispersed state within the inorganic matrix part and having elasticity; wherein a material making up the dispersed component has a modulus of elasticity in tension of 100 Pa or more and 3.5 GPa or less. The composite member has a porosity of 20% or less in a section of the inorganic matrix part.

BRIEF DESCRIPTION OF DRAWINGS

FIG. 2(*b*) is a schematic sectional view of the vicinity of grain boundaries of a particle group of an inorganic substance.

FIG. 6(*b*) is a diagram illustrating binarized data of the secondary electron image at position 1 in the test sample according to example 1-3.

FIG. 7(*b*) is a diagram illustrating binarized data of the secondary electron image at position 2 in the test sample according to example 1-3.

FIG. 8(*b*) is a diagram illustrating binarized data of the secondary electron image at position 3 in the test sample according to example 1-3.

FIG. 9(*b*) is a diagram illustrating binarized data of the secondary electron image at position 1 in the test sample according to example 2.

FIG. 10(*b*) is a diagram illustrating binarized data of the secondary electron image at position 2 in the test sample according to example 2.

FIG. 11(*b*) is a diagram illustrating binarized data of the secondary electron image at position 3 in the test sample according to example 2.

DESCRIPTION OF EMBODIMENTS

Figure 1:
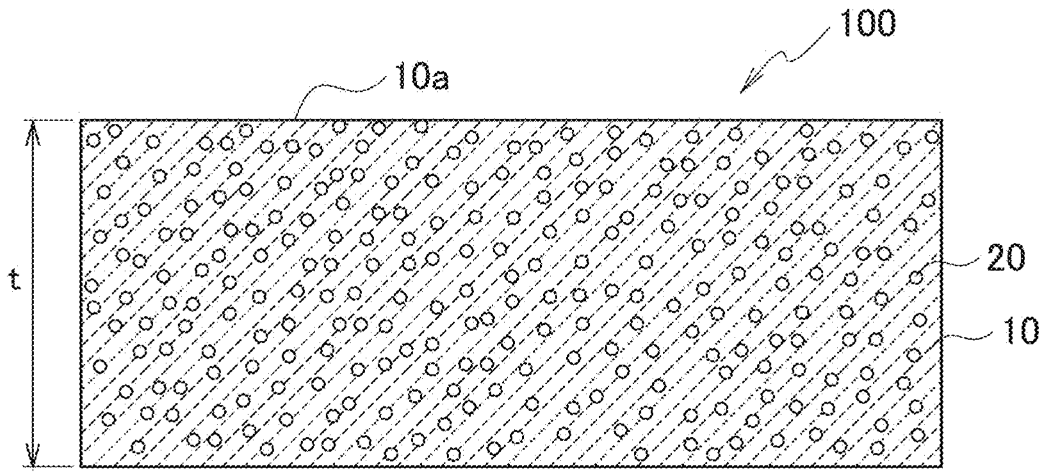
FIG. 1 is a schematic sectional view of an example of a composite member according to a present embodiment.

Referring to the drawings, a description is given below of a composite member according to a present embodiment. Note that dimensional ratios in the drawings are exaggerated for convenience of explanation and are sometimes different from actual ratios.

Composite Member

Figure 2:
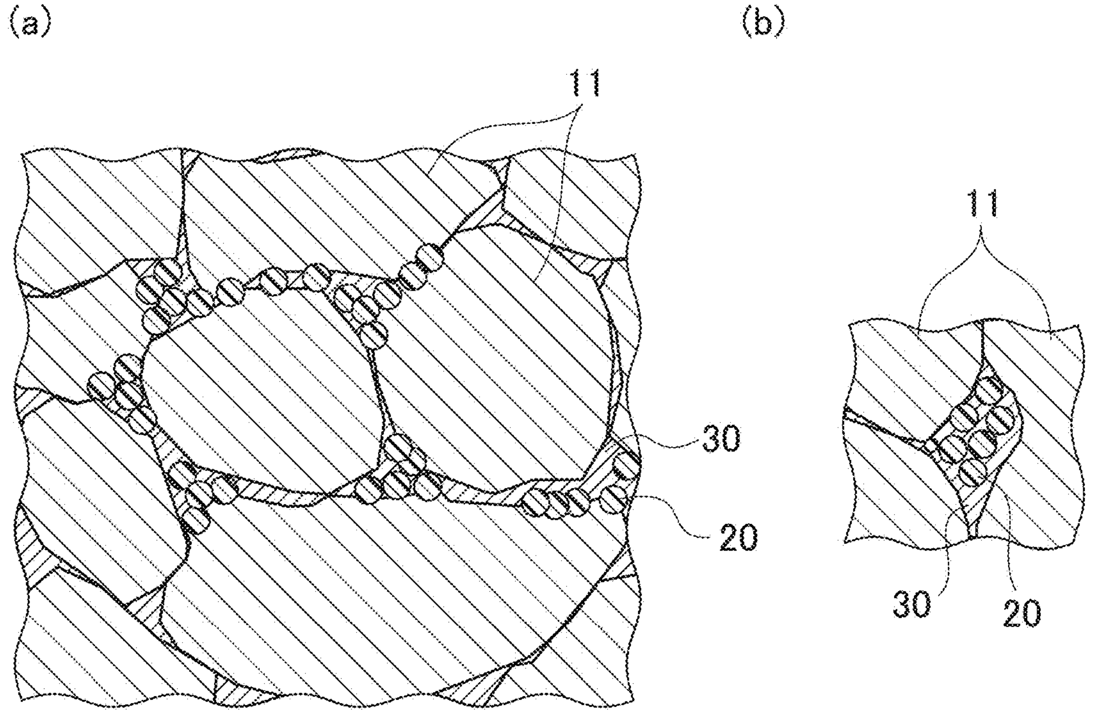
FIG. 2(*a*) is an enlarged schematic sectional view of the composite member according to the present embodiment.

As illustrated in FIG. 1, a composite member 100 according to the present embodiment includes an inorganic matrix part 10 made from an inorganic substance and a dispersed component 20 present in a dispersed state within the inorganic matrix part 10. As illustrated in FIG. 2, the inorganic matrix part 10 includes multiple particles 11 made from the inorganic substance, and the particles 11 of the inorganic substance bond with each other to form the inorganic matrix part 10.

Preferably, the inorganic substance making up the inorganic matrix part 10 contains at least one metal element selected from the group consisting of an alkali metal, an alkaline earth metal, a transition metal, a base metal, and a semimetal. In this description, the alkaline earth metal includes beryllium and magnesium in addition to calcium, strontium, barium, and radium. The base metal includes aluminum, zinc, gallium, cadmium, indium, tin, mercury, thallium, lead, bismuth, and polonium. The semimetal includes boron, silicon, germanium, arsenic, antimony, and tellurium. Among these, preferably, the inorganic substance contains at least one metal element selected from the group consisting of zinc, aluminum, and magnesium. As described later, the inorganic substance containing the metal element described above can easily form a connection part derived from the inorganic substance by a pressure heating method.

Preferably, the inorganic substance contains at least one of an oxide or an oxide hydroxide of the above-described metal element. More preferably, the inorganic substance contains at least one of an oxide or an oxide hydroxide of the above-described metal element, as a main component. That is, preferably, the inorganic substance contains at least one of an oxide or an oxide hydroxide of the above-described metal element in an amount of 50 mol % or more, more preferably, in an amount of 80 mol % or more. Note that the oxide of the above-described metal element includes a phosphate, a silicate, an aluminate, and a borate in addition to a compound in which only oxygen is bonded to the metal element. Such an inorganic substance has high stability against oxygen and water vapor in the atmosphere. Accordingly, dispersing the dispersed component 20 inside the inorganic matrix part 10 prevents the dispersed component 20 from contacting with oxygen and water vapor and thus prevents deterioration of the dispersed component 20.

Particularly preferably, the inorganic substance making up the inorganic matrix part 10 is an oxide. When the inorganic substance is made from an oxide of the above-described metal element, the composite member 100 with higher durability is obtained. Note that, preferably, the oxide of the metal element is a compound in which only oxygen is bonded to the metal element.

Preferably, the inorganic substance making up the inorganic matrix part 10 is a polycrystalline substance. That is, preferably, the particles 11 of the inorganic substance are crystalline particles, and preferably, the inorganic matrix part 10 is formed by aggregating a large number of particles 11. When the inorganic substance making up the inorganic matrix part 10 is a polycrystalline substance, the composite member 100 with higher durability is obtained compared to the case where the inorganic substance is made from an amorphous substance. Note that, more preferably, the particles 11 of the inorganic substance are crystalline particles containing at least one metal element selected from the group consisting of an alkali metal, an alkaline earth metal, a transition metal, a base metal, and a semimetal. Preferably, the particles 11 of the inorganic substance are crystalline particles containing at least one of an oxide or an oxide hydroxide of the above-described metal element. More preferably, the particles 11 of the inorganic substance are crystalline particles containing at least one of an oxide or an oxide hydroxide of the above-described metal element, as a main component.

Note that preferably, the inorganic substance making up the inorganic matrix part 10 is boehmite. Boehmite is an aluminum oxide hydroxide represented by a composition formula of AlOOH. Boehmite is insoluble in water and hardly reacts with acids and alkalis at room temperature, having high chemical stability. Boehmite also has excellent heat resistance due to its high dehydration temperature of around 500° C. Since boehmite has the specific gravity of about 3.07, when the inorganic matrix part 10 is made from boehmite, the composite member 100 that is lightweight and excellent in chemical stability is obtained.

When the inorganic substance making up the inorganic matrix part 10 is boehmite, the particles 11 may be particles only of a boehmite phase, or particles of a mixed phase of boehmite, and an aluminum oxide or an aluminum hydroxide other than boehmite. For example, the particles 11 may be a mixture of a phase of boehmite and a phase of gibbsite ($Al(OH)_3$).

Note that preferably, the inorganic substance making up the inorganic matrix part 10 does not contain a hydrate of a calcium compound. The calcium compound here is tricalcium silicate (alite, $3CaO•SiO_2$), dicalcium silicate (belite, $2CaO•SiO_2$), calcium aluminate ($3CaO•Al_2O_3$), calcium aluminoferrite ($4CaO•Al_2O_3•Fe_2O_3$), or calcium sulfate ($CaSO_4•2H_2O$). When the inorganic substance making up the inorganic matrix part 10 contains a hydrate of the above-described calcium compound, the composite member obtained may have a porosity in the section of the inorganic matrix part exceeding 20%. Thus, preferably, the inorganic substance does not contain the above-described hydrated calcium compound. Preferably, the inorganic substance making up the inorganic matrix part 10 does not contain phosphate cement, zinc phosphate cement, and calcium phosphate cement. When the inorganic substance does not contain these cements, the porosity of the composite member obtained is reduced to 20% or less.

The average particle size of the particles 11 of the inorganic substance making up the inorganic matrix part 10 is not limited. However, the average particle size of the particles 11 is preferably 300 nm or more and 50 μm or less, more preferably 300 nm or more and 30 μm or less, still more preferably 300 nm or more and 10 μm or less, particularly preferably 300 nm or more and 5 μm or less. When the average particle size of the particles 11 of the inorganic substance is within this range, the particles 11 firmly bond with each other, increasing the strength of the inorganic matrix part 10. When the average particle size of the particles 11 of the inorganic substance is within this range, the ratio of pores present inside the inorganic matrix part 10 is 20% or less, which prevents the deterioration of the dispersed component 20, as described later. In this description, the value of "average particle size" is, unless otherwise stated, a value calculated as an average value of particle size of particles observed in several to several tens of visual fields by using observation means, such as a scanning electron microscope (SEM) or a transmission electron microscope (TEM).

The shape of the particles 11 of the inorganic substance is not limited but may have a spherical shape, for example. The particles 11 may have a whisker shape (acicular shape) or a scale shape. The particles having a whisker shape or the particles having a scale shape have higher contact with other particles compared to the spherical particles, which easily improves the strength of the inorganic matrix part 10. Therefore, using particles of such a shape for the particles 11 enhances the strength of the entire composite member 100. As the particles 11, which have a whisker shape, for example, particles containing at least one of a zinc oxide (ZnO) or an aluminum oxide ($Al_2O_3$) are usable.

Preferably, the dispersed component 20 dispersed in the inorganic matrix part 10 is made from a material having elasticity. Dispersing the dispersed component 20 having elasticity within the inorganic matrix part 10 makes it possible to enhance shock absorbency of the composite member 100. That is, by dispersing the dispersed component 20 within the composite member 100, the composite member 100 is easily deformed when a load (impact) applied from the outside of the composite member 100, thereby relieving and absorbing the load.

In the composite member 100, preferably, the modulus of elasticity in tension of the material making up the dispersed component 20 is 100 Pa or more and 3.5 GPa or less. More preferably, the modulus of elasticity in tension of the material making up the dispersed component 20 is 1000 Pa or more and 0.5 GPa or less. By using the dispersed component 20 having such a modulus of elasticity in tension, the inorganic matrix part 10 is easily deformed, thereby enhancing the shock absorbency of the composite member 100. Note that the modulus of elasticity in tension of the material making up the dispersed component 20 can be measured in accordance with Japanese Industrial Standard JIS K7161-1.

The material making up the dispersed component 20 is not limited as long as it satisfies the above-described modulus of elasticity in tension. Preferably, the material is resin. That is, the dispersed component 20 preferably includes a resin, more preferably includes a resin as a main component. When the dispersed component 20 is made from resin, the shock and vibration through the inorganic matrix part 10 are easily absorbed by the resin, and the inorganic matrix part 10 is easily deformed, thereby enhancing the shock absorbency of the composite member 100. Note that the resin making up the dispersed component 20 is not limited as long as it satisfies the above-described modulus of elasticity in tension. For example, at least one of the resins in Tables 1 and 2 is usable. Tables 1 and 2 show together the typical modulus of elasticity in tension in each resin without the addition of a filler.

TABLE 1

| | Modulus of elasticity in tension (MPa) |
|---|---|
| Low density polyethylene (PE) | 260-520 |
| High density polyethylene (PE) | 1100 |
| Polypropylene (PP) | 1100-1600 |
| Polystyrene (PS) | 2300-3300 |
| Acrylonitrile-butadiene-styrene copolymer (ABS) | 900-2900 |
| Acrylonitrile-styrene copolymer (AS) | 3300-3900 |
| Polyvinyl chloride (PVC) (rigid) | 2400-4100 |
| Polymethyl methacrylate (PMMA) | 2200-3200 |
| Polyamide (PA6) | 2600 |
| Polyamide (PA66) | 1600-3800 |
| Polyacetal (POM) (homopolymer) | 3100-3600 |
| Polyacetal (POM) (copolymer) | 2800-3200 |
| Polycarbonate (PC) | 2400 |
| Polyethylene terephthalate (PET) | 2800-4300 |
| Polybutylene terephthalate (PBT) | 1900-3000 |
| Polyphenylene ether (PPE) | 2500-2600 |
| Polyphenylene sulfide (PPS) | 3300 |
| Polyether sulfone (PES) | 2400 |
| Polysulfone (PSU) | 2500 |
| Polyimide (PI) | 2100 |
| Polyetherimide (PEI) | 3000 |

TABLE 2

| | Modulus of elasticity in tension (MPa) |
|---|---|
| Polytetrafluoroethylene (PTFE) | 440-550 |
| Tetrafluoroethylene-hexafluoropropylene copolymer (FEP) | 340 |
| Ethylene-tetrafluoroethylene copolymer (ETFE) | 820 |
| Polyvinylidene difluoride (PVDF) | 1300-1500 |

TABLE 2-continued

| | Modulus of elasticity in tension (MPa) |
|---|---|
| Ethylene-chlorotrifluoroethylene copolymer (ECTFE) | 1600 |
| Polychlorotrifluoroethylene (PCTFE) | 1000-2100 |
| Polyvinyl fluoride (PVF) | 1900 |

As described above, preferably, the inorganic matrix part 10 includes a group of particles of an inorganic substance in the composite member 100. That is, preferably, the inorganic matrix part 10 includes the multiple particles 11 made from the inorganic substance, and the particles 11 of the inorganic substance bond with each other to form the inorganic matrix part 10. In this case, the particles 11 may be in point contact with each other, or in surface contact with each other by particle surfaces of the particles 11. Preferably, the dispersed component 20 is present in an approximately uniformly dispersed state inside the inorganic matrix part 10. However, preferably, the dispersed component 20 is present at grain boundaries of the particles 11 of the inorganic substance. As illustrated in FIG. 2, by unevenly distributing the dispersed component 20 among adjacent particles 11 of the inorganic substance, the dispersed component 20 deforms to fill gaps among the particles 11 of the inorganic substance. This enables the ratio of pores present within the inorganic matrix part 10 to be further reduced.

When the inorganic matrix part 10 includes the group of particles of the inorganic substance in the composite member 100, the dispersed component 20 may be present among adjacent particles 11 of the inorganic substance, However, as illustrated in FIG. 2, in addition to the dispersed component 20, there may be an amorphous part 30 containing an amorphous inorganic compound among the adjacent particles 11 of the inorganic substance. The presence of the amorphous part 30 allows the adjacent particles 11 of the inorganic substance to bond with each other via the amorphous part 30, further increasing the strength of the inorganic matrix part 10. Note that preferably, the amorphous part 30 is present to contact at least surfaces of the particles 11 of the inorganic substance. The amorphous part 30 may be present between the particles 11 of the inorganic substance and the dispersed component 20 and among the adjacent dispersed component 20 in addition to among the adjacent particles 11 of the inorganic substance.

Preferably, the amorphous part 30 contains an amorphous inorganic compound. Specifically, the amorphous part 30 may be a part made from only the amorphous inorganic compound or a mixture of the amorphous inorganic compound and a crystalline inorganic compound. The amorphous part 30 may be a part in which the crystalline inorganic compound is dispersed inside the amorphous inorganic compound.

Preferably, the particles 11 of the inorganic substance and the amorphous part 30 contain the same metal element, and preferably, the metal element is at least one selected from the group consisting of an alkali metal, an alkaline earth metal, a transition metal, a base metal, and a semimetal. That is, preferably, the inorganic compound making up the particles 11 and the amorphous inorganic compound making up the amorphous part 30 contain at least the same metal element. The inorganic compound making up the particles 11 and the amorphous inorganic compound making up the amorphous part 30 may have the same chemical composition or may have different chemical compositions. Specifically, when the metal element is zinc, the inorganic compound making up the particles 11 and the amorphous inorganic compound making up the amorphous part 30 may both be the zinc oxide (ZnO). Alternatively, while the inorganic compound making up the particles 11 is ZnO, the amorphous inorganic compound making up the amorphous part 30 may be a zinc-containing oxide other than ZnO.

When the amorphous part 30 is a part in which the amorphous inorganic compound and the crystalline inorganic compound are mixed, the amorphous inorganic compound and the crystalline inorganic compound may have the same chemical composition or may have different chemical compositions from each other.

In the composite member 100, preferably, the particles 11 and the amorphous part 30 contain an oxide of at least one metal element selected from the group consisting of an alkali metal, an alkaline earth metal, a transition metal, a base metal, and a semimetal. Since the oxide of such a metal element has high durability, contact of the dispersed component 20 with oxygen and water vapor is prevented for a long time, and deterioration of the dispersed component 20 is prevented.

Preferably, the oxide of the metal element contained in both the particles 11 and the amorphous part 30 is at least one selected from the group consisting of a zinc oxide, a magnesium oxide, and a composite of a zinc oxide and a magnesium oxide. As described later, by using the oxide of the metal element described above, the amorphous part 30 is formed by a simple method, As described above, the inorganic substance making up the inorganic matrix part 10 may be boehmite. In this case, the particles 11 of the inorganic matrix part 10 may be particles only of a boehmite phase, or particles of a mixed phase of boehmite, and an aluminum oxide or an aluminum hydroxide other than boehmite. In this case, preferably, the adjacent particles 11 are bonded through at least one of an oxide or an oxide hydroxide of aluminum. That is, preferably, the particles 11 are not bonded by an organic binder of an organic compound and are not also bonded by an inorganic binder of an inorganic compound except for an oxide and an oxide hydroxide of aluminum. Note that when the adjacent particles 11 are bonded through at least one of an oxide or an oxide hydroxide of aluminum, the oxide and the oxide hydroxide of aluminum may be crystalline, or amorphous.

When the inorganic matrix part 10 is made from boehmite, the presence ratio of the boehmite phase is preferably 50% by mass or more, more preferably 60% by mass or more, still more preferably 70% by mass or more. By increasing the ratio of the boehmite phase, the inorganic matrix part 10 that is lightweight and excellent in chemical stability and heat resistance is obtained. Note that the ratio of the boehmite phase in the inorganic matrix part 10 is obtained by measuring the X-ray diffraction pattern of the inorganic matrix part 10 by an X-ray diffraction method and then performing a Rietveld analysis.

In the composite member 100, preferably, the porosity in the section of the inorganic matrix part 10 is 20% or less. That is, when the section of the inorganic matrix part 10 is observed, preferably, the average value of the ratio of pores per unit area is 20% or less. When the porosity is 20% or less, the dispersed component 20 is sealed inside the dense inorganic substance. Thus, the ratio of the dispersed component 20 contacting with oxygen and water vapor from the outside of the composite member 100 decreases, which prevents the oxidative decomposition of the dispersed component 20 and maintains the elasticity of the dispersed component 20 for a long time, The porosity in the section of the inorganic matrix part 10 is preferably 15% or less, more preferably 10% or less, still more preferably 5% or less. As the porosity in the cross section of the inorganic matrix part 10 is smaller, the contact of the dispersed component 20 with oxygen and water vapor is more prevented, which prevents the deterioration of the dispersed component 20.

In this description, the porosity is determined as follows. First, the section of the inorganic matrix part 10 is observed to discriminate the inorganic matrix part 10, the dispersed component 20, and the pores. Then, the unit area and the area of pores in that unit area are measured to obtain the ratio of pores per unit area. After the ratio of pores per unit area is obtained at multiple locations, the average value of the ratio of pores per unit area is taken as the porosity. Note that when the section of the inorganic matrix part 10 is observed, an optical microscope, a scanning electron microscope (SEM), or a transmission electron microscope (TEM) is usable. The unit area and the area of pores in that unit area may be measured by binarizing an image observed with a microscope.

The shape of the composite member 100 is not limited but may be, for example, a plate shape. A thickness t of the composite member 100 (inorganic matrix part 10) is not limited but may be, for example, 50 μm or more. As described later, the composite member 100 is formed by a pressure heating method. Thus, the composite member 100 having a large thickness is easily obtained. Note that the thickness t of the composite member 100 (inorganic matrix part 10) may be 1 mm or more. The thickness t of the composite member 100 (inorganic matrix part 10) may be 1 cm or more. The upper limit of the thickness t of the composite member 100 (inorganic matrix part 10) is not limited but may be, for example, 50 cm.

Figure 3:
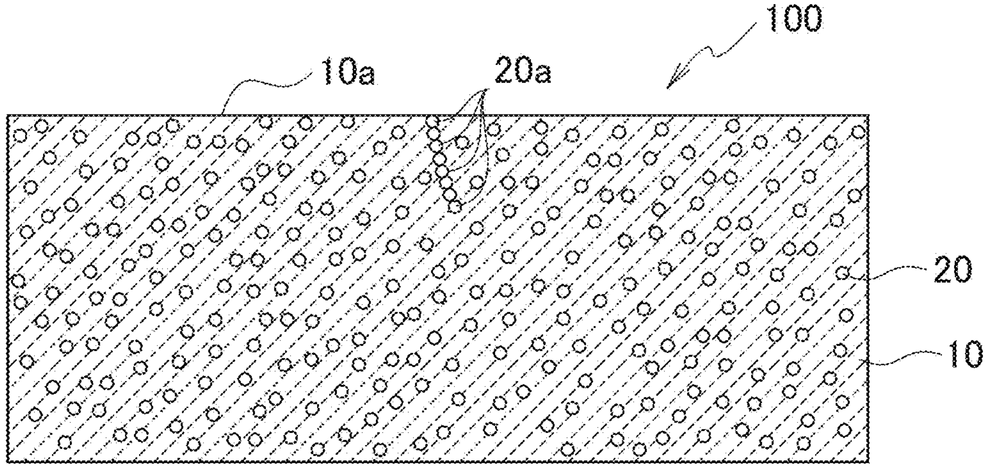
FIG. 3 is a schematic sectional view of another example of the composite member according to the present embodiment.

In the composite member 100, preferably, the dispersed component 20 is not continuously present from a surface 10*a* of the inorganic matrix part 10 to the inside of the inorganic matrix part 10 and is not present in a film shape on the surface 10*a* of the inorganic matrix part 10. Specifically, preferably, the dispersed component 20 is present in a dispersed state inside the inorganic matrix part 10. A part of the dispersed component 20 may be segregated inside the inorganic matrix part 10. However, preferably, an dispersed component 20*a* segregated is not continuously present from the surface 10*a* to the inside of the inorganic matrix part 10 as illustrated in FIG. 3. When the dispersed component 20*a* is made from resin, the dispersed component 20*a* present on the surface 10*a* of the inorganic matrix part 10 may deteriorate by contact with oxygen and water vapor in the atmosphere. The dispersed component 20*a* continuously present from the surface 10*a* to the inside of the inorganic matrix part 10 may also deteriorate due to the oxidative deterioration of the dispersed component 20*a* present on the surface 10*a*. Therefore, from the viewpoint of preventing the deterioration of the dispersed component 20, preferably, the dispersed component 20 is not continuously present from the surface 10*a* to the inside of the inorganic matrix part 10.

With respect to the dispersed component 20 dispersed in the inorganic matrix part 10, preferably, a part of the dispersed component 20 is not present in a film shape on the surface 10*a* of the inorganic matrix part 10. When the dispersed component 20 is made from resin, the dispersed component 20 in a film shape may oxidize and deteriorate due to exposure to oxygen and water vapor in the atmosphere.

Figure 4:
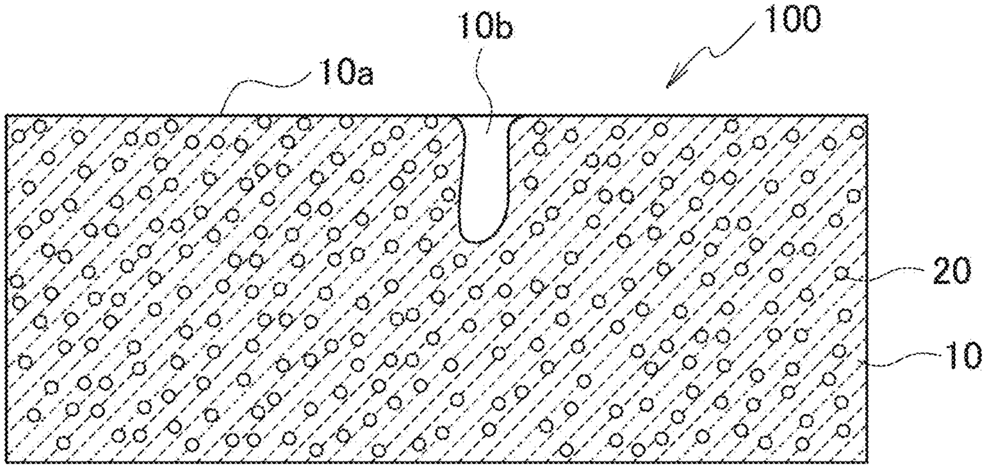
FIG. 4 is a schematic sectional view of another example of the composite member according to the present embodiment.

In the composite member 100, preferably, the inorganic matrix part 10 has no gap 10*b* communicating from the surface 10*a* to the inside of the inorganic matrix part 10. The dispersed component 20 inside the inorganic matrix part 10 is covered with the particles 11 of the inorganic substance and thus hardly oxidizes and deteriorates. However, as illustrated in FIG. 4, when the gap 10*b* is present in the inorganic matrix part 10, oxygen and water vapor may reach the inside of the inorganic matrix part 10 through the gap 10*b* and may contact with the dispersed component 20 inside the inorganic matrix part 10. Thus, from the viewpoint of preventing the oxidative deterioration of the dispersed component 20, preferably, the inorganic matrix part 10 does not have the gap 10*b* communicating from the surface 10*a* to the inside.

As described above, the composite member 100 according to the present embodiment includes the inorganic matrix part 10 made from an inorganic substance and the dispersed component 20 that is present in a dispersed state inside the inorganic matrix part 10 and has elasticity. The material making up the dispersed component 20 has a modulus of elasticity in tension of 100 Pa or more to 3.5 GPa or less. The composite member 100 has a porosity of 20% or less in the section of the inorganic matrix part 10. In the composite member 100, the dispersed component 20 having a predetermined modulus of elasticity in tension is dispersed within the inorganic matrix part 10 to enhance the elasticity of the entire composite member 100. Thus, even when an impact is applied from the outside, this enables the composite member 100 to deform according to the impact, thereby absorbing the shock. In the composite member 100, since the dispersed component 20 is dispersed throughout the interior of the inorganic matrix part 10, the composite member 100 as a whole has shock absorbency. Thus, the composite member 100 is capable of absorbing shock from any direction.

The composite member 100 has the porosity of 20% or less in the section. Thus, the ratio of the dispersed component 20 contacting with oxygen and water vapor decreases, which prevents the oxidative decomposition of the dispersed component 20 and maintains the elasticity of the composite member 100 for a long time. Since the inorganic matrix part 10 has few internal pores and the inorganic substance is dense, the composite member 100 has high strength.

As described above, the composite fiber body of Patent Literature 1 may have the fiber bundle layer peeled due to the difference in the thermal expansion coefficient between the fiber bundle layer and the single ceramic layer. However, the composite member 100 has the dispersed component 20 highly dispersed in the inorganic matrix part 10, having no peeling issue. That is, in the composite member 100, since the inorganic matrix part 10 is disposed to enclose the dispersed component 20, the entire surface of the dispersed component 20 comes into contact with the inorganic matrix part 10. As a result, since the contact area between the inorganic matrix part 10 and the dispersed component 20 increases, separation between them is prevented, and high stability is maintained for a long time.

In the composite member 100, preferably, the Young's modulus of the material making up the inorganic matrix part 10 is larger than the Young's modulus of the material making up the dispersed component 20. Since the inorganic matrix part 10 itself is made from an inorganic substance, it has a large Young's modulus and is difficult to strain, and thus is difficult to relieve a shock. However, since the Young's modulus between the inorganic matrix part 10 and the dispersed component 20 is in such a relationship, the shock through the inorganic matrix part is easily absorbed by the dispersed component, and further the inorganic matrix part is easily deformed, thereby relieving the shock. Note that the Young's modulus is determined by a tension test at room temperature.

In the composite member 100, preferably, the dispersed component 20 includes resin, and the inorganic substance is at least one of a metal oxide or a metal oxide hydroxide. When the dispersed component 20 is made from resin, the shock through the inorganic matrix part 10 is easily absorbed by the dispersed component 20, and further the inorganic matrix part 10 is easily deformed, thereby enhancing the shock absorbency of the composite member 100. Metal oxides and metal oxide hydroxides have high stability against oxygen and water vapor in the atmosphere. Thus, when the inorganic substance in the inorganic matrix part is made from a metal oxide or a metal oxide hydroxide, the oxygen permeability of the inorganic matrix part is lowered, and thus the gas barrier property is improved, thereby preventing the contact of the dispersed component with oxygen and water vapor and preventing the deterioration of the dispersed component.

In the composite member 100, preferably, the inorganic matrix part 10 has a volume ratio larger than that of the dispersed component 20. Increasing the volume ratio of the inorganic matrix part 10 more than that of the dispersed component 20 enables the periphery of the dispersed component 20 to be easily covered with particles 11 of the inorganic substance. Thus, from the viewpoint of further preventing the deterioration of the dispersed component 20, preferably, the inorganic matrix part 10 has a volume ratio larger than that of the dispersed component 20.

Method For Manufacturing Composite Member

Next, a method for manufacturing the composite member 100 according to the present embodiment is described. The composite member 100 is manufactured by pressurizing and heating a mixture of particles of an inorganic substance and the dispersed component 20 in a state containing a solvent. By using such a pressure heating method, particles of the inorganic substance bond with each other, forming the inorganic matrix part 10 with the dispersed component 20 dispersed therein.

Specifically, first, a powder of the inorganic substance and a power of the dispersed component 20 are mixed to prepare a mixed powder. The method for mixing the powder of the inorganic substance and the powder of the dispersed component 20 is not limited and may be carried out by a dry or wet process. The powder of the inorganic substance and the powder of the dispersed component 20 may be mixed in air or in an inert atmosphere.

Next, a solvent is added to the mixed powder. The solvent is not limited, but for example, one dissolving a part of the inorganic substance when the mixed powder is pressurized and heated is usable. As the solvent, one reacting with the inorganic substance to form another inorganic substance different from said inorganic substance is usable. As such a solvent, at least one selected from the group consisting of an acidic aqueous solution, an alkaline aqueous solution, water, an alcohol, a ketone, and an ester is usable. As the acidic aqueous solution, an aqueous solution with a pH of 1 to 3 is usable. As the alkaline aqueous solution, an aqueous solution with a pH of 10 to 14 is usable. As the acidic aqueous solution, preferably, an aqueous solution of an organic acid is used. As the alcohol, preferably, an alcohol with 1 to 12 carbon atoms is used.

The mixture containing the inorganic substance, the dispersed component 20, and the solvent is prepared by mixing the powder of the inorganic substance and the powder of the dispersed component 20, and then adding the solvent, as described above. However, a method for preparing the mixture containing the inorganic substance, the dispersed component 20, and the solvent is not limited to such a method. The method for preparing the mixture includes first mixing the dispersed component 20 and the solvent. In this case, the dispersed component 20 may or may not be dissolved in the solvent. Then, by adding the inorganic substance powder to the mixture of the dispersed component 20 and the solvent, the mixture containing the inorganic substance, the dispersed component 20, and the solvent may be prepared.

The mixture containing the inorganic substance, the dispersed component 20, and the solvent is then filled inside the mold. After filling the mold with the mixture, the mold may be heated as necessary. Then, by applying pressure to the mixture inside the mold, the inside of the mold becomes a high pressure state. At this time, the inorganic substance and the dispersed component 20 are densified, and at the same time, particles of the inorganic substance bond with each other.

When a solvent that dissolves a part of an inorganic substance is used, an inorganic compound making up the inorganic substance is dissolved in the solvent under high pressure. The dissolved inorganic compound penetrates a gap between the inorganic substance and the dispersed component 20, a gap among the inorganic substance, and a gap among the dispersed component 20. Then, the solvent in the mixture is removed in this state to form a connection part derived from the inorganic substance between the inorganic substance and the dispersed component 20, among the inorganic substance, and among the dispersed component 20. When a solvent that reacts with an inorganic substance to form another inorganic substance different from said inorganic substance is used, an inorganic compound making up the inorganic substance reacts with the solvent under high pressure. Then, the other inorganic substance generated by the reaction is filled in the gap between the inorganic substance and the dispersed component 20, the gap among the inorganic substance, and the gap among the dispersed component 20 to form a connection part derived from the other inorganic substance.

When a solvent that dissolves a part of an inorganic substance is used, heating and pressurizing conditions of the mixture containing the inorganic substance, the dispersed component 20, and the solvent are not limited as long as the conditions are such that dissolution of the surface of the inorganic substance progresses. When a solvent that reacts with an inorganic substance to form another inorganic substance different from said inorganic substance is used, heating and pressurizing conditions of the mixture are not limited as long as the reaction between the inorganic substance and the solvent proceeds. For example, preferably, the mixture containing the inorganic substance, the dispersed component 20, and the solvent is heated to 50 to 300° C. and then pressurized at a pressure of 10 to 600 MPa. Note that the temperature at which the mixture containing the inorganic substance, the dispersed component 20, and the solvent is heated is more preferably 80 to 250° C., still more preferably 100 to 200° C. The pressure at which the mixture containing the inorganic substance, the dispersed component 20, and the solvent is pressurized is more preferably 50 to 400 MPa, still more preferably 50 to 200 MPa.

Then, by taking out the molded body from the inside of the mold, the composite member 100 is obtained. Note that, preferably, the connection part derived from the inorganic substance formed between the inorganic substance and the dispersed component 20, among the inorganic substance, and among the dispersed component 20 is the amorphous part 30 described above.

As a method for manufacturing an inorganic member made from a ceramic, a sintering method has been known. The sintering method is a method for obtaining a sintered body by heating an aggregate of a solid powder made from an inorganic substance at a temperature lower than the melting point. However, in the sintering method, the solid powder is heated to 1000° C. or higher, for example. Therefore, when the sintering method is used to obtain a composite member made from the inorganic substance and the resin dispersed component, the dispersed component carbonizes due to heating at a high temperature, obtaining no composite member. However, in the manufacturing method for the composite member 100 according to the present embodiment, the mixture formed by mixing the powder of the inorganic substance and the powder of the dispersed component 20 is heated at a low temperature of 300°C. or less, and thus the dispersed component 20 hardly carbonizes. Thus, the dispersed component 20 is stably dispersed inside the inorganic matrix part 10 made from the inorganic substance, and the shock absorbency is given.

Further, in the manufacturing method according to the present embodiment, since the mixture of the powder of the inorganic substance and the powder of the dispersed component 20 is pressurized while being heated, the inorganic substance is aggregated to form the inorganic matrix part 10 that is dense. As a result, the number of pores inside the inorganic matrix part 10 is reduced, and thus the composite member 100 is obtained that has high strength while preventing the oxidative deterioration of the dispersed component 20.

Next, a method for manufacturing the composite member 100 is described in which the inorganic substance making up the inorganic matrix part 10 is boehmite. The composite member 100 in which the inorganic substance is boehmite is produced by mixing a hydraulic alumina, the dispersed component 20, and a solvent containing water, and then pressurizing and heating the mixture. The hydraulic alumina is an oxide obtained by heat-treating the aluminum hydroxide and contains ρ alumina. Such a hydraulic alumina has the property of bonding and curing by hydration reaction. Therefore, by using the pressure heating method, the hydration reaction of the hydraulic alumina progresses to have the hydraulic alumina bonded to each other while the crystal structure is changed to boehmite, so that the composite member 100 is formed.

Specifically, a hydraulic alumina powder, the dispersed component 20, and a solvent containing water are first mixed to prepare a mixture. Preferably, the solvent containing water is pure water or ion exchange water. However, the solvent containing water may contain an acidic substance or an alkaline substance, in addition to water. As long as the solvent containing water contains water as a main component, the solvent containing water may contain, for example, an organic solvent (for example, an alcohol), Preferably, the amount of the solvent added to the hydraulic alumina is an amount in which the hydration reaction of the hydraulic alumina sufficiently progresses.

The amount of the solvent added is preferably 20 to 200% by mass to the hydraulic alumina, more preferably 50 to 150% by mass to the hydraulic alumina.

Next, the mixture formed by mixing the hydraulic alumina, the dispersed component 20, and the solvent containing water is filled inside the mold. After filling the mold with the mixture, the mold may be heated as necessary. By applying pressure to the mixture inside the mold, the inside of the mold becomes a high pressure state. At this time, the hydraulic alumina becomes highly filled, and particles of the hydraulic alumina bond with each other, resulting in high density. Specifically, by adding water to the hydraulic alumina, the hydraulic alumina undergoes a hydration reaction to form boehmite and an aluminum hydroxide on the surface of particles of the hydraulic alumina. By pressurizing the mixture in the mold while heating, the boehmite and the aluminum hydroxide generated mutually diffuse among adjacent hydraulic alumina particles, so that the hydraulic alumina particles gradually bond with each other. Then, the dehydration reaction proceeds by heating, and the crystal structure changes from aluminum hydroxide to boehmite. It is supposed that the hydration reaction of the hydraulic alumina, the mutual diffusion among the hydraulic alumina particles, and the dehydration reaction proceed almost simultaneously.

When the molded body is taken out from the inside of the mold, the composite member 100 is obtained in which the particles 11 bond with each other via at least one of the oxide or the oxide hydroxide of aluminum while the dispersed component 20 is highly dispersed.

Heating and pressurizing conditions of the mixture formed by mixing the hydraulic alumina, the dispersed component 20, and the solvent containing water are not limited as long as the reaction between the hydraulic alumina and the solvent progresses. For example, preferably, the mixture formed by mixing the hydraulic alumina, the dispersed component 20, and the solvent containing water is pressurized at a pressure of 10 to 600 MPa while being heated to 50 to 300° C. Note that the temperature at which the mixture formed by mixing the hydraulic alumina, the dispersed component 20, and the solvent containing water is heated is more preferably 80 to 250° C., still more preferably 100 to 200° C. The pressure at which the mixture formed by mixing the hydraulic alumina, the dispersed component 20 and the solvent containing water is pressurized is more preferably 50 to 600 MPa, still more preferably 200 to 600 MPa.

As described above, the method for manufacturing the composite member 100 includes: a step of mixing the powder of an inorganic substance with the powder of the dispersed component 20 to obtain a mixture; and a step of adding a solvent dissolving an inorganic substance or a solvent reacting with the inorganic substance to the mixture, and then pressurizing and heating the mixture. Alternatively, the method for manufacturing the composite member 100 includes: a step of mixing the dispersed component 20 with a solvent dissolving an inorganic substance or a solvent reacting with the inorganic substance; a step of mixing an inorganic substance powder with the solvent containing the dispersed component 20 to obtain a mixture; and a step of pressurizing and heating the mixture. Preferably, heating and pressurizing conditions of the mixture are a temperature of 50 to 300° C. and a pressure of 10 to 600MPa. In the manufacturing method according to the present embodiment, since the composite member 100 is formed under such a low temperature condition, carbonization of the dispersed component 20 is prevented, and thus a ceramic member having the shock absorbency is obtained.

The method for manufacturing the composite member 100 in which the inorganic substance is boehmite includes: a step of mixing the hydraulic alumina, the dispersed component 20, and the solvent containing water to obtain the mixture; and a step of pressurizing and heating the mixture. Preferably, heating and pressurizing conditions of the mixture are a temperature of 50 to 300° C. and a pressure of 10 to 600 MPa. In this manufacturing method, the composite member 100 is formed under such a low temperature condition, and thus the obtained member is mainly made from boehmite phase. Therefore, the composite member 100 that is lightweight and excellent in chemical stability is obtained by a simple method.

Composite Member Usage

Next, the usage of the composite member 100 according to the present embodiment is described. As described above, the composite member 100 according to the present embodiment is formable as a plate shape having a large thickness and is also excellent in shock absorbency. The composite member 100 has high mechanical strength, is cuttable in the same manner as a general ceramic member, and is surface-processible. Thus, the composite member 100 is suitably usable as an indoor structural member. Specifically, since the composite member 100 absorbs a shock when a person falls, it is usable as a floor material, such as a floor material around water and a floor material of a bath. The composite member 100 is also usable as a member around steps and stairs.

Further, since the composite member 100 has the shock absorbency, it is possible to improve the feeling when a person touches it. Thus, the composite member 100 is applicable to a portion touched by a human. Specifically, the composite member 100 is applicable to a toilet seat, a bathtub, and a washstand.

Since the composite member 100 prevents rebound of water, the composite member 100 is also applicable to a water-related member. Specifically, the composite member 100 is applicable to a toilet bowl. The composite member 100 not only prevents the rebound of water but also has the potential to prevent the sound of water.

As described above, since the composite member 100 has shock absorbency, it is suitably usable as a protective material of a device. Specifically, the composite member 100 is applicable not only as an absorbent material that protects against shocks and vibrations received from the outside of the device, but also as a member that absorbs vibrations, sounds, high frequencies, and the like generated inside the device.

The composite member 100 is suitably usable as a construction member. The construction member is not limited, but for example, an exterior wall material (siding), a roof material, and the like are mentioned, Using the composite member 100 as a roof material prevents scattering of rain and the sound of rain. Road materials and outer groove materials are also mentioned as the construction member. Using the composite member 100 as a road material absorbs shock to the pedestrian and improves the feeling during walking in addition to prevention of scattering of rain and the sound of water.

The composite member according to the present embodiment is described in more detail with reference to examples below, but the present embodiment is not limited thereto.

EXAMPLE 1

Preparation Of Test Samples

Example 1-1

First, hydraulic alumina BK-112 manufactured by SUMITOMO CHEMICAL COMPANY LIMITED was prepared as the hydraulic alumina. Note that this hydraulic alumina has the central particle size of 16 μm. As a result of measuring the X-ray diffraction pattern of this hydraulic alumina by the X-ray diffraction method, it was found to be a mixture of boehmite (AlOOH) and gibbsite (aluminum hydroxide, $Al(OH)_3$). The hydraulic alumina also included ρ alumina.

Further, as polymethyl methacrylate (PMMA), cross-linked polymethyl methacrylate, grade: MBX-5, manufactured by Sekisui Kasei Co., Ltd. was prepared. Note that the cross-linked polymethyl methacrylate has an average particle size of 5 μm.

Next, the hydraulic alumina and PMMA were weighed so that hydraulic alumina: PMMA=95% by volume: 5% by volume, and then the hydraulic alumina and PMMA were mixed using a mortar and pestle made of agate. Further, the mixture was obtained by weighting ion exchange water to be 80% by mass to the hydraulic alumina and mixing it with the hydraulic alumina and PMMA.

Next, the obtained mixture was put into a cylindrical mold (φ10) having an internal space. The mixture was then heated and pressurized under the condition of 400 MPa, 180°C., and 20 minutes, and thus the test sample of this example was obtained.

Example 1-2

A test sample of this example was obtained in the same manner as in example 1-1 except that the weighting was performed so that hydraulic alumina: PMMA=90% by volume: 10% by volume.

Example 1-3

First, as polyethylene (PE), micronized modified HD polyethylene wax CERAFLOUR (registered trademark) 950 manufactured by BYK-Chemie GmbH was prepared. Note that the polyethylene has an average particle size (D 50) of 9 μm.

Next, the same hydraulic alumina and PE as in example 1-1 were weighed so that hydraulic alumina PE=93% by volume: 7% by volume, and then the hydraulic alumina and PE were mixed using a mortar and pestle made of agate. Further, the mixture was obtained by weighing ion exchange water to be 80% by mass to the hydraulic alumina and mixing it with the hydraulic alumina and PE.

Next, the obtained mixture was put into a cylindrical mold (Φ10) having an internal space. The test sample of this example was then obtained by heating and pressurizing the mixture under the condition of 400 MPa, 180° C., and 20 minutes.

Comparative Example 1-1

The mixture was obtained by weighing the ion exchange water to be 80% by mass to the same hydraulic alumina as in example 1-1 and then mixing the hydraulic alumina and the ion exchange water using a mortar and pestle made of agate. Next, the obtained mixture was put into a cylindrical mold (Φ10) having an internal space. The mixture was then heated and pressurized under the condition of 400 MPa, 180°C., and 20 minutes, and thus the test sample of this example was obtained.

Table 3 summarizes mixing ratios of hydraulic alumina, PMMA, and PE in the test samples obtained in examples 1-1 to 1-3 and comparative example 1-1.

TABLE 3

| | Example 1-1 | Example 1-2 | Example 1-3 | Comparative example 1-1 |
|---|---|---|---|---|
| Hydraulic alumina (% by volume) | 95 | 90 | 93 | 100 |
| PMMA (% by volume) | 5 | 10 | — | — |
| PE (% by volume) | — | — | 7 | — |
| Ball bouncing height | 1 cm or less | 1 cm or less | 2 cm | 4 cm |

Evaluation

Porosity Measurement

Figure 6:
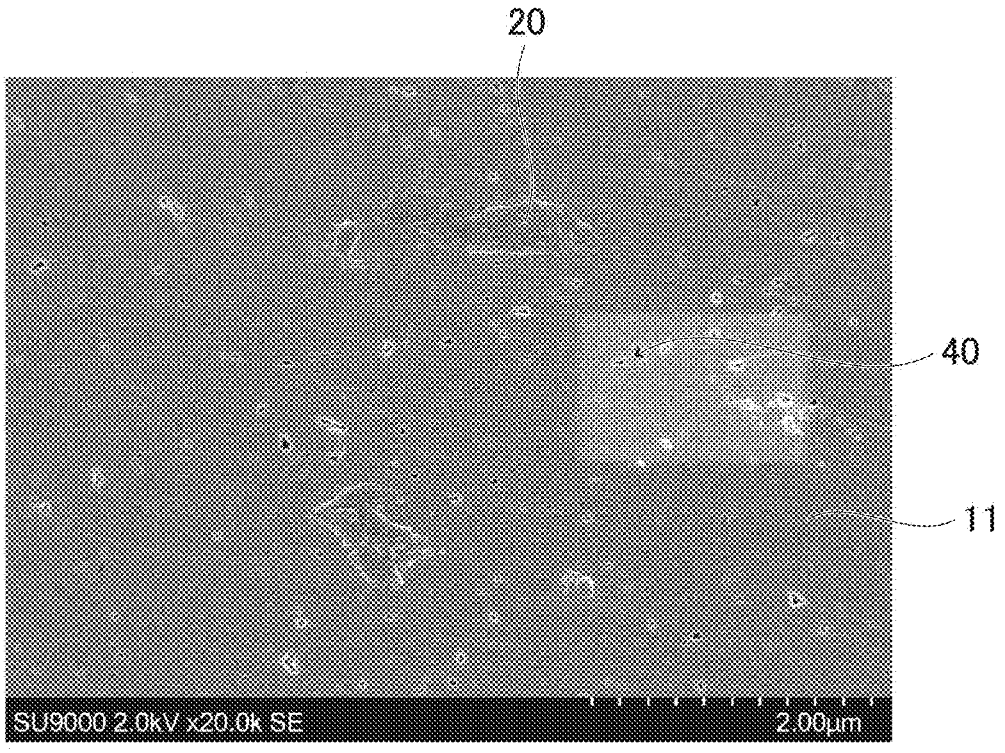
FIG. 6(*a*) is a diagram illustrating a secondary electron image at position 1 in a test sample according to example 1-3.
Figure 6:
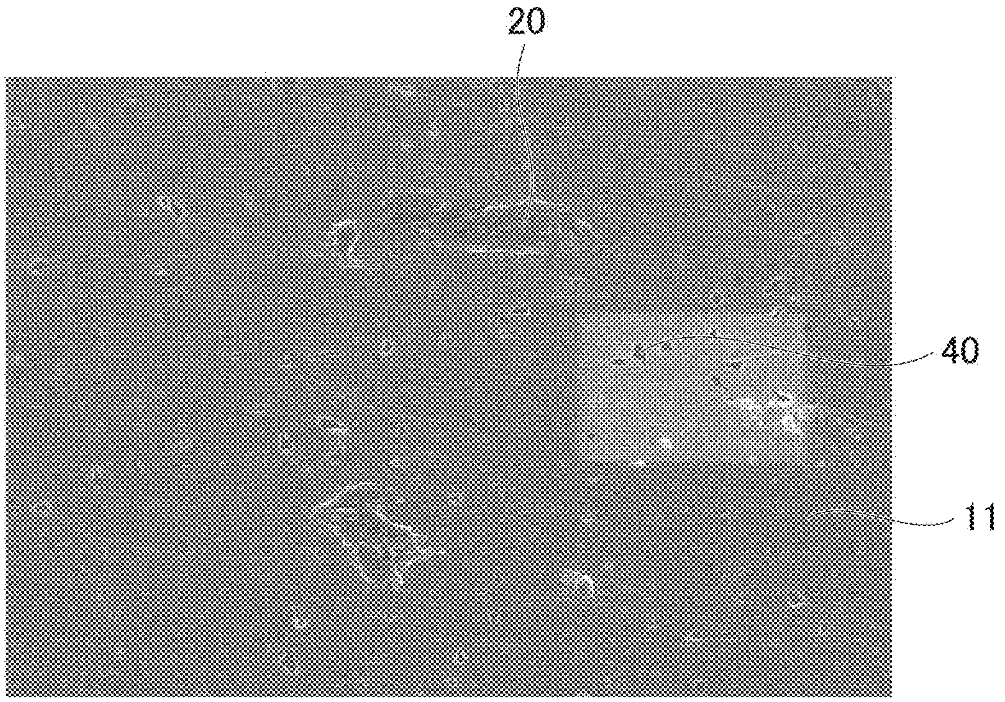

First, cross section polisher processing (CP processing) was applied to the section of the test sample of example 1-3, which is cylindrical. Next, using a scanning electron microscope (SEM), a secondary electron image was observed at a magnification of 20,000 on the section of the test sample. FIGS. 6(*a*), 7(*a*), and 8(*a*) illustrate secondary electron images obtained by observing three points (positions 1 to 3) in the section of the test sample of example 1-3.

Figure 7:
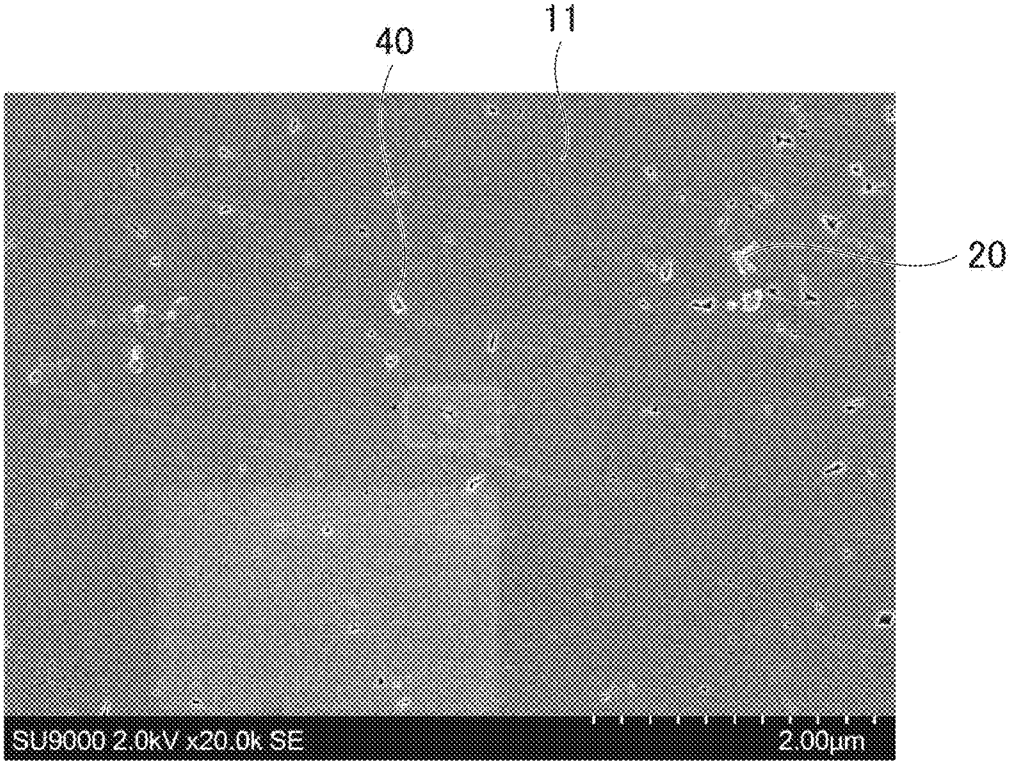
FIG. 7(*a*) is a diagram illustrating a secondary electron image at position 2 in a test sample according to example 1-3.
Figure 7:
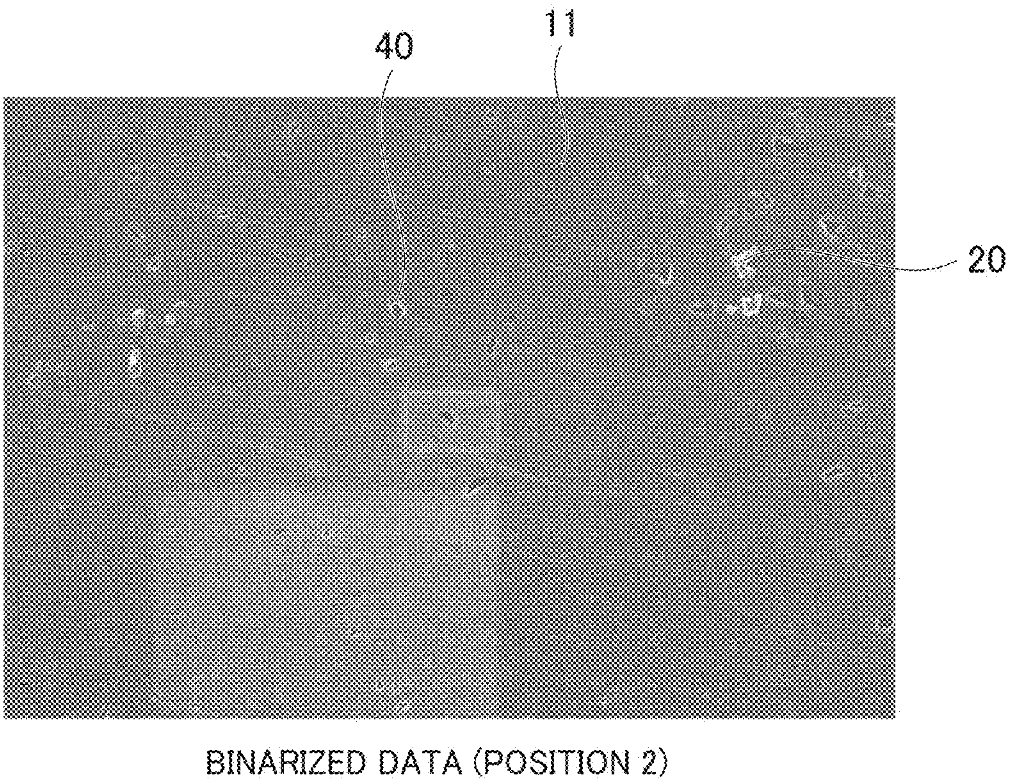
Figure 8:
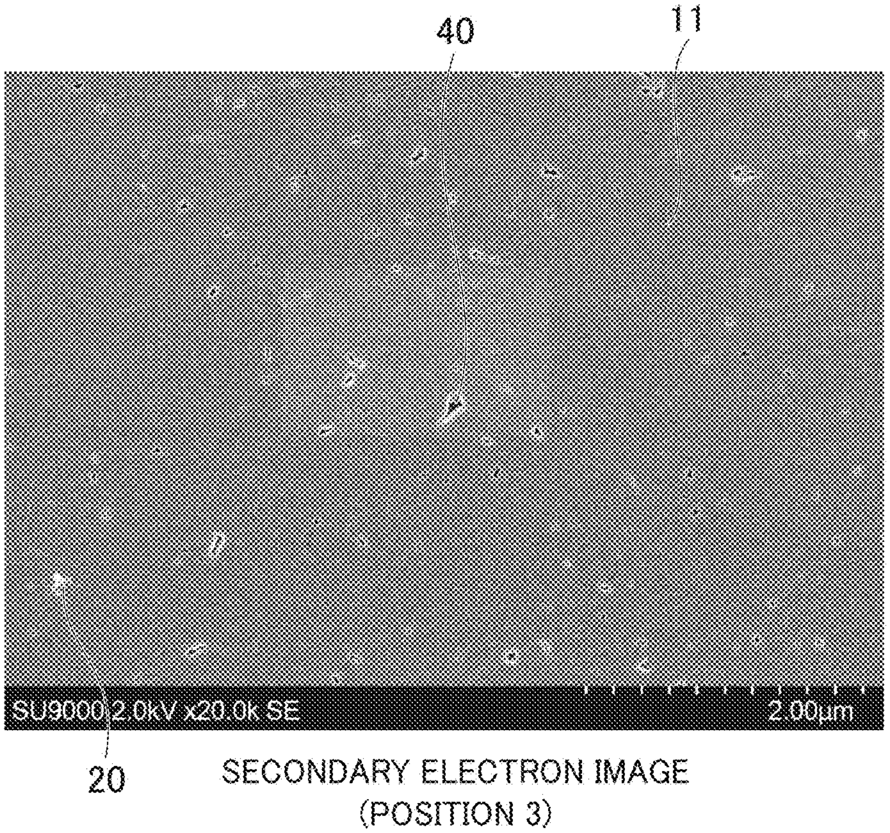
FIG. 8(*a*) is a diagram illustrating a secondary electron image at position 3 in a test sample according to example 1-3.
Figure 8:
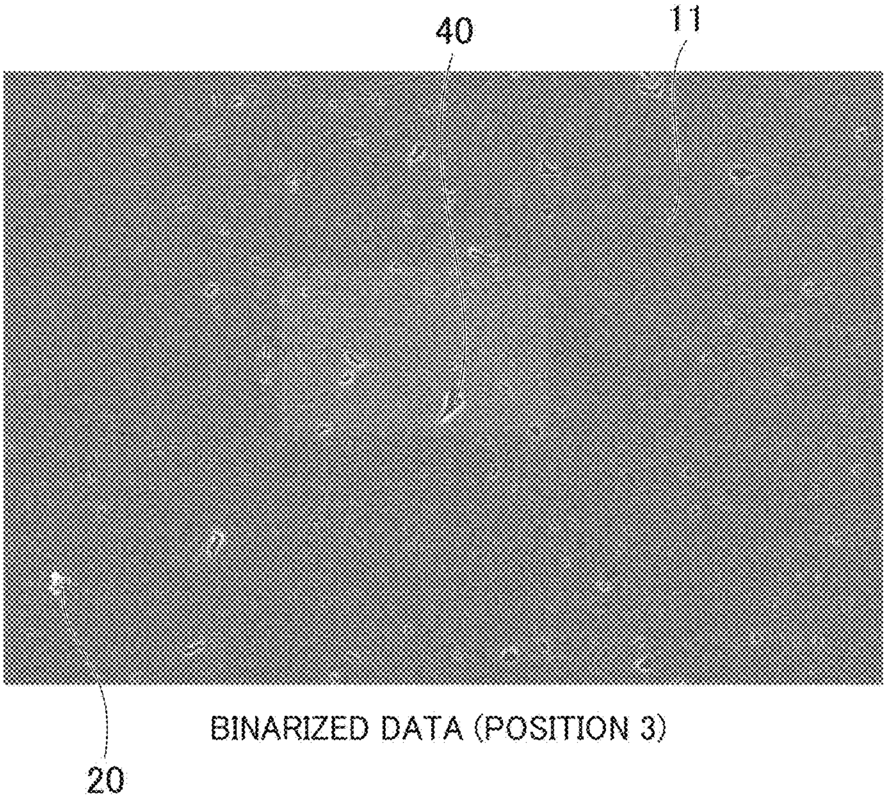

Next, by binarizing the SEM images of the three fields, the pore portions were clarified. The binarized images of the secondary electron images of FIGS. 6(*a*), 7(*a*), and 8(*a*) are illustrated in FIGS. 6(*b*), 7(*b*), and 8(*b*), respectively. Then, the area ratio of the pore portion was calculated from the binarized images, and the average value was taken as the porosity. Specifically, in FIG. 6(*b*), the area ratio of the pore portion at position 1 was 1.4%. In FIG. 7(*b*), the area ratio of the pore portion at position 2 was 1.1%. In FIG. 8(*b*), the area ratio of the pore portion at position 3 was 1.7%. Therefore, the porosity of the test sample of example 1-3 was 1.4%, which is the average value of the area ratio of the pore portion at positions 1 to 3.

From FIGS. 6, 7, and 8, the porosity of the test sample of example 1-3 is less than 10%, which indicates that the dispersed component is prevented from contacting with air and water vapor, thus preventing oxidative deterioration. Note that the dispersed component 20 in FIGS. 6, 7, and 8 is an aggregate of polyethylene. Although it cannot be confirmed in these figures, fine polyethylene is dispersed among the particles 11 of boehmite.

Shock Absorbency Test

Figure 5:
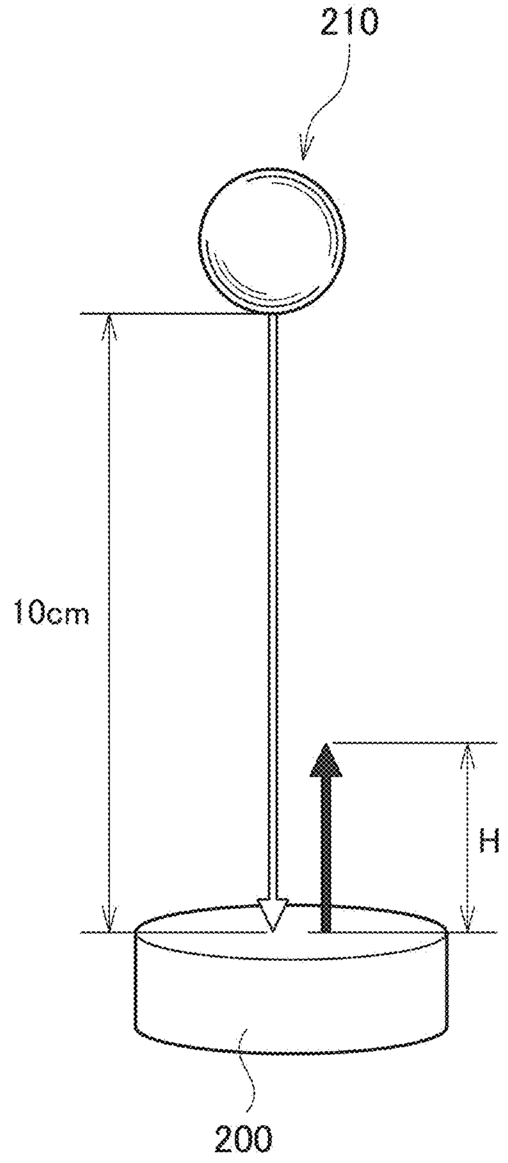
FIG. 5 is a schematic diagram illustrating a method for measuring shock absorbency in example 1.

After a hollow resin ball was dropped and collided with each test sample of examples 1-1 to 1-3 and comparative example 1-1, the shock absorbency was evaluated by measuring the bouncing height of the hollow resin ball. Specifically, as illustrated in FIG. 5, a hollow resin ball 210 was dropped from a height of 10 cm and collided with the surface of a test sample 200 of each example having a diameter φ of 10 mm. Then, a height H when the hollow resin ball 210 bounced off the surface of the test sample 200 was measured. Note that for the hollow resin ball, a resin sphere having a mass of 0.15 g and a diameter of 3 mm was used.

The higher the shock absorbency of the test sample, the lower the height H because the repulsive force of the hollow resin ball is absorbed. The results of the shock absorbency test for each test sample are illustrated together in Table 3.

As illustrated in Table 3, the test sample of comparative example 1-1 without the dispersed component had a height of 4 cm when the hollow resin ball rebounded. In contrast, the test samples of example 1-1 and example 1-2 in which the PMMA was added as the dispersed component had a height of 1 cm or less when the hollow resin ball rebounded. The test sample of example 1-3 in which the PE was added as the dispersed component had a height of 2 cm when the hollow resin ball rebounded.

As described above, it is understood that shock absorbency is imparted to the composite member by dispersing the dispersed component in the inorganic matrix part made from boehmite particles. Further, since the dispersed component is covered with the inorganic matrix part and hardly deteriorates by oxidation, elasticity is stably imparted for a long time.

EXAMPLE 2

Preparation Of Test Samples

Zinc oxide particles having an average particle size $D_{50}$ of about 1 μm (manufactured by Kojundo Chemical Laboratory Co.,Ltd., purity 99.99%) were prepared as the inorganic particles. The same polyethylene particles as in example 1-3 were prepared as the dispersed component. After the polyethylene particles were weighed to be 7% by volume to the zinc oxide particles, the zinc oxide particles and the polyethylene particles were wet-mixed with acetone using a mortar and pestle made of agate to obtain a mixed powder.

Next, the obtained mixed powder was put into a cylindrical mold (φ10) having an internal space. Further, 1 M of acetic acid was added to the mixed powder filled inside the mold to be 200 μL per 1 g of the zinc oxide particles. Then, the test sample of this example was obtained by heating and pressurizing the mixed powder containing the acetic acid under the condition of 50 MPa, 150° C., and 30 minutes.

Evaluation

Porosity Measurement

Figure 9:
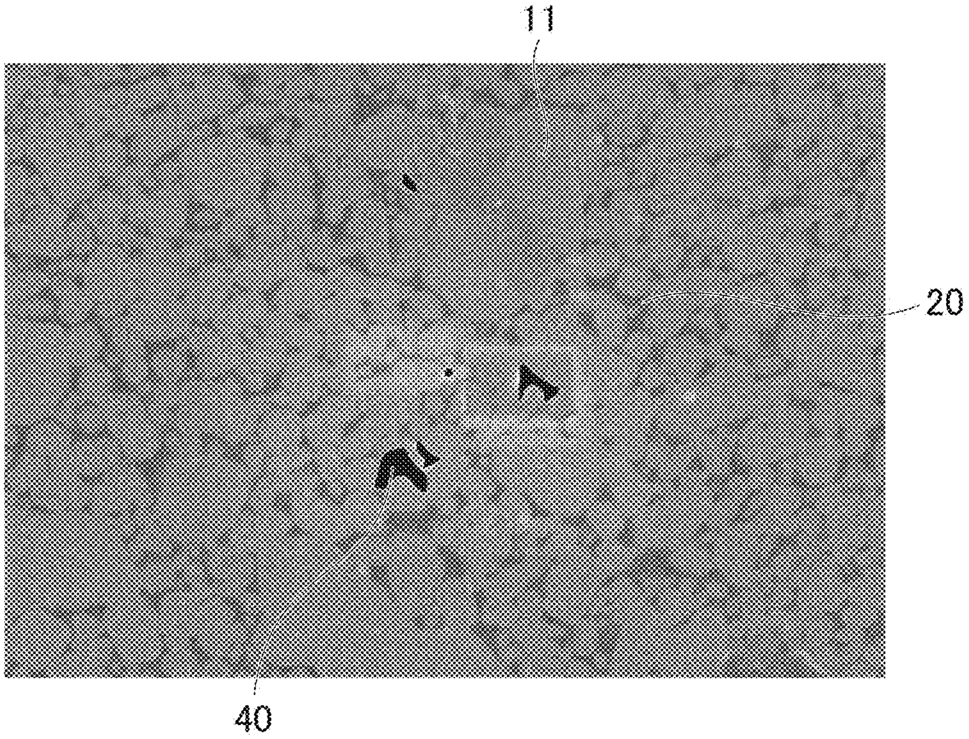
FIG. 9(*a*) is a diagram illustrating a secondary electron image at position 1 in a test sample according to example 2.
Figure 9:
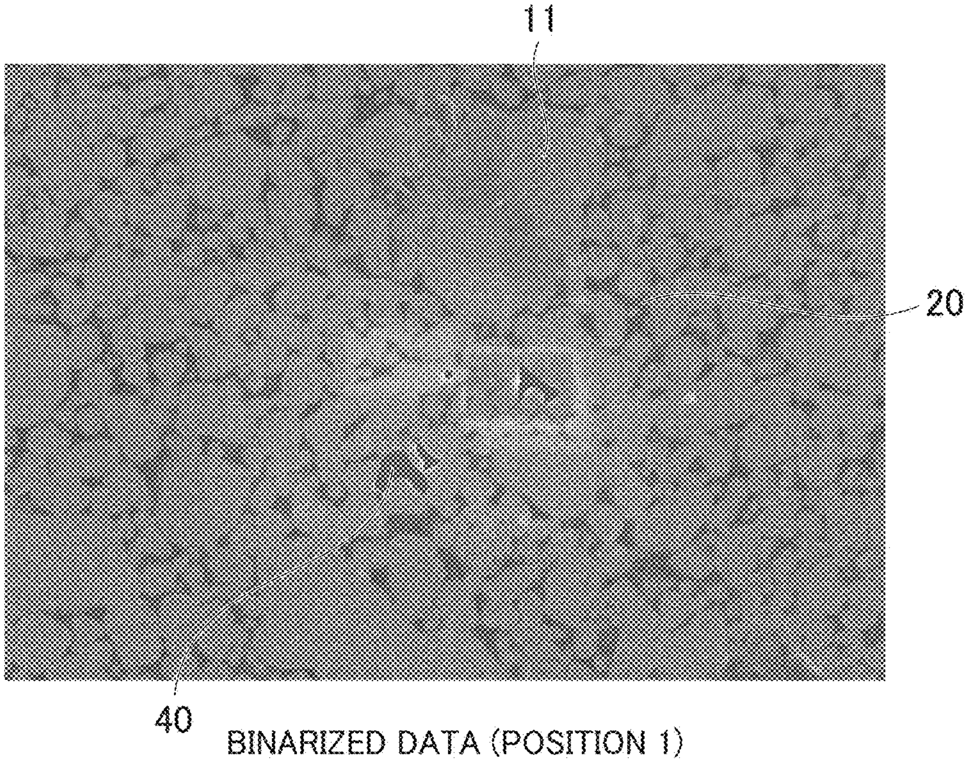

First, cross section polisher processing was applied to the section of the test sample of example 2, which is cylindrical. Next, using the scanning electron microscope, a secondary electron image was observed at a magnification of 20,000 on the section of the test sample. FIGS. 9(*a*), 10(*a*), and 11(*a*) illustrate secondary electron images obtained by observing three points (positions 1 to 3) in the section of the test sample of example 2.

Figure 10:
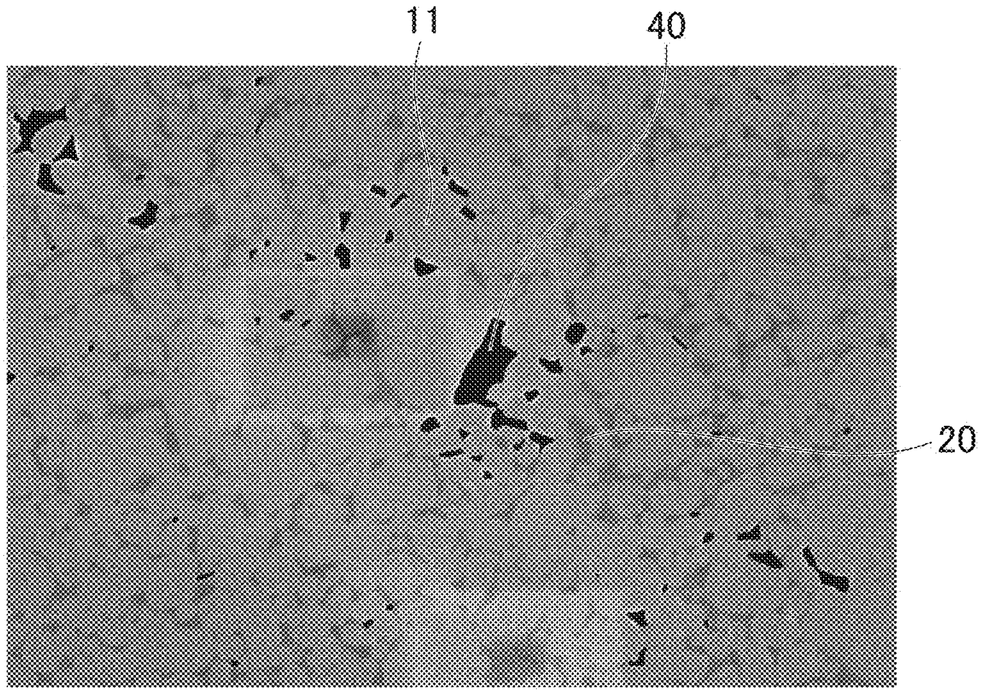
FIG. 10(*a*) is a diagram illustrating a secondary electron image at position 2 in a test sample according to example 2.
Figure 10:
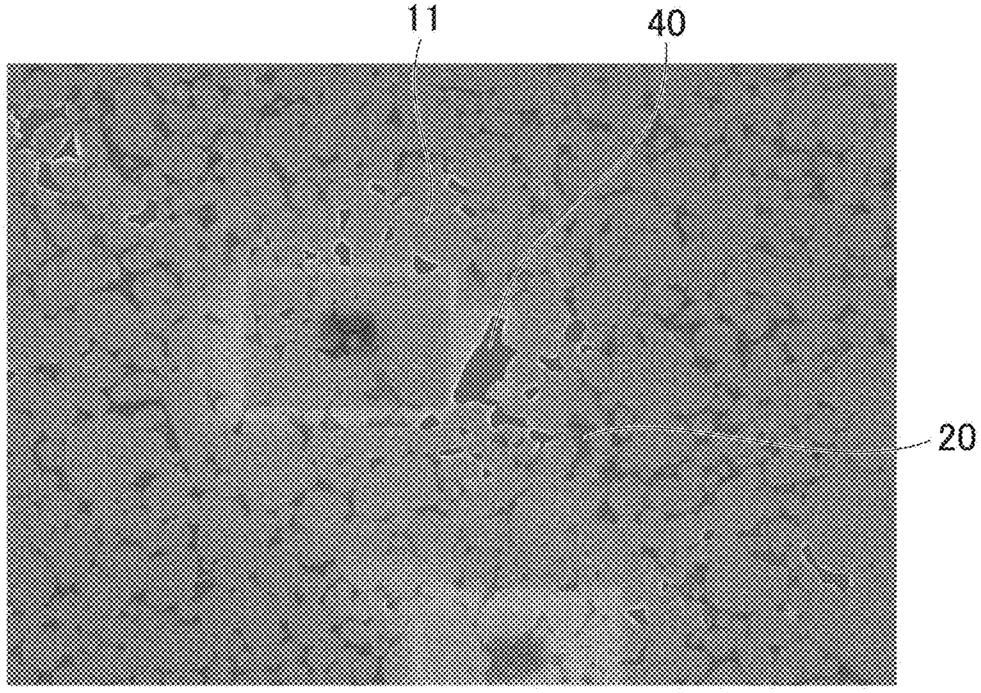
Figure 11:
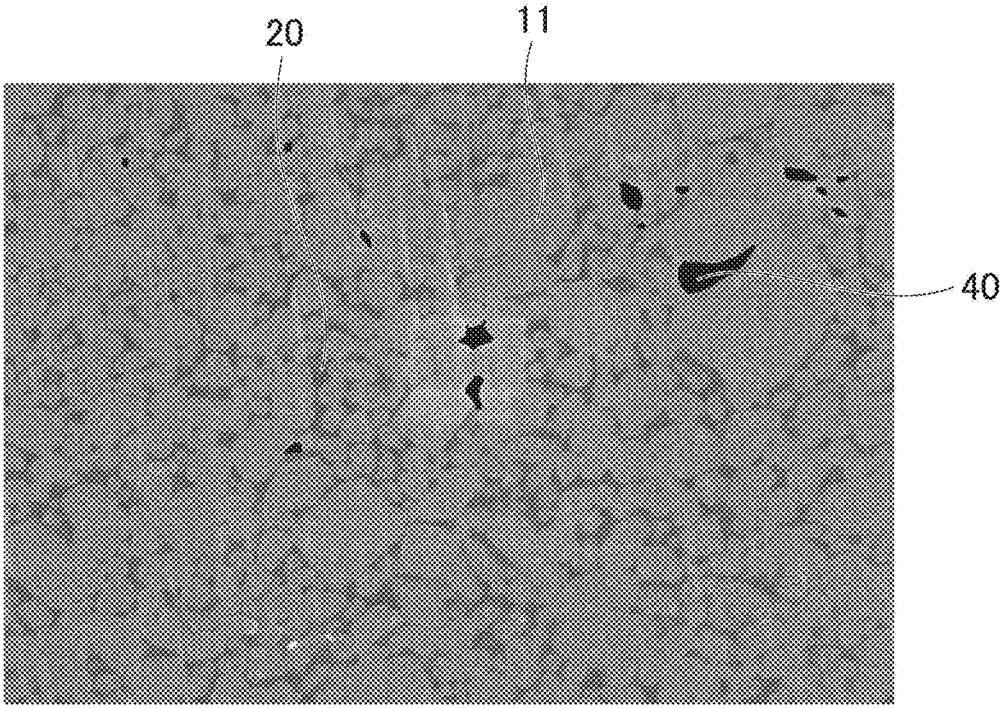
FIG. 11(*a*) is a diagram illustrating a secondary electron image at position 3 in a test sample according to example 2.
Figure 11:
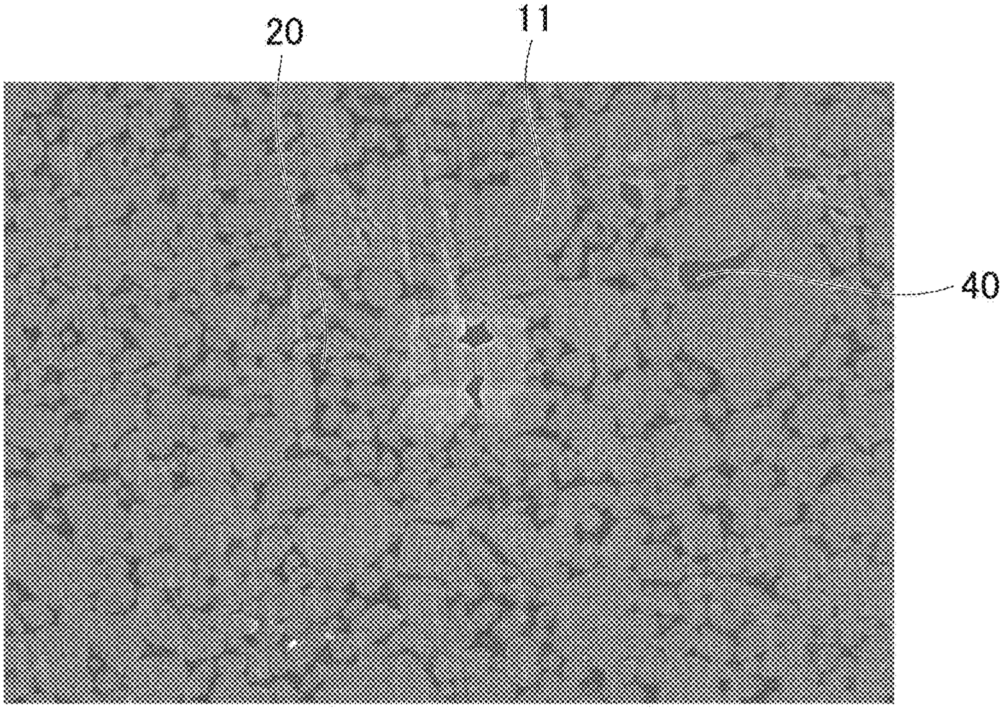

Next, by binarizing the SEM images of the three fields, the pore portions were clarified. The binarized images of the secondary electron images of FIGS. 9(*a*), 10(*a*), and 11(*a*) are illustrated in FIGS. 9(*b*), 10(*b*), and 11(*b*), respectively. Then, the area ratio of the pore portion was calculated from the binarized image, and the average value was taken as the porosity. Specifically, in FIG. 9(*b*), the area ratio of the pore portion at position 1 was 0.44%. In FIG. 10(*b*), the area ratio of the pore portion at position 2 was 2.1%. In FIG. 11(*b*), the area ratio of the pore portion at position 3 was 0.86%. Therefore, the porosity of the test sample of example 2 was 1.1%, which is the average value of the area ratio of the pore portion at positions 1 to 3.

From FIGS. 9, 10, and 11, the porosity of the test sample of example 2 is also less than 10%, which indicates that the dispersed component is prevented from contacting with air and water vapor, thus preventing oxidation degradation.

Although the contents according to the present embodiment have been described above with reference to the examples, it is obvious to those skilled in the art that the present embodiment is not limited to these descriptions and that various modifications and improvements are possible.

The entire contents of Japanese Patent Application No, 2019-178441 (filed on: Sep. 30, 2019) are incorporated herein by reference.

INDUSTRIAL APPLICABILITY

According to the present disclosure, there is provided a composite member that is stable for a long time and is capable of absorbing shock as a whole.

REFERENCE SIGNS LIST

10 Inorganic matrix part
10*a* Surface of inorganic matrix part
11 Particles of inorganic substance
20 Dispersed component
100 Composite member

The invention claimed is:

1. A composite member comprising:

an inorganic matrix part comprising multiple particles made from an inorganic substance, the inorganic substance containing boehmite in an amount of 50 mol % or more, the particles of the inorganic substance bonding with each other to form the inorganic matrix part; and a dispersed component present in a dispersed state within the inorganic matrix part and having elasticity, wherein the particles of the inorganic substance bond with each other via a connection part derived from the inorganic substance, wherein the inorganic substance is a polycrystalline substance, and the connection part is an amorphous part containing an amorphous inorganic compound, wherein the particles of the inorganic substance and the amorphous part contain a same metal element, wherein a material making up the dispersed component has a modulus of elasticity in tension of 100 Pa or more and 3.5 GPa or less, and wherein the composite member has a porosity of 20% or less in a section of the inorganic matrix part.

2. The composite member according to claim 1, wherein the material making up the dispersed component has a modulus of elasticity in tension of 1000 Pa or more and 0.5 GPa or less.

3. The composite member according to claim 1, wherein a material making up the inorganic matrix part has a Young's modulus larger than that of the material making up the dispersed component.

4. The composite member according to claim 1, wherein the dispersed component comprises a resin, and the inorganic substance further comprises at least one of a metal oxide or a metal oxide hydroxide.

5. The composite member according to claim 1, wherein the dispersed component is not continuously present from a surface to an inside of the inorganic matrix part and is not present in a film shape on the surface of the inorganic matrix part.

6. The composite member according to claim 1, wherein the inorganic matrix part has a volume ratio larger than that of the dispersed component.

7. The composite member according to claim 1, wherein the composite member has a porosity of 10% or less in a section of the inorganic matrix part.

8. The composite member according to claim 1, wherein the inorganic substance making up the inorganic matrix part does not contain hydrates, phosphate cement, zinc phosphate cement, and calcium phosphate cement.

9. The composite member according to claim 1, wherein an average particle size of the particles of the inorganic substance making up the inorganic matrix part is from 300 nm to 50 μm.

10. The composite member according to claim 1, wherein a thickness of the inorganic matrix part is 50 μm or more.

11. The composite member according to claim 1, wherein a thickness of the inorganic matrix part is 1 mm or more.

12. The composite member according to claim 1, wherein a thickness of the inorganic matrix part is 1 cm or more.

* * * * *